United States Patent
Droux et al.

(10) Patent No.: US 7,885,257 B2
(45) Date of Patent: *Feb. 8, 2011

(54) MULTIPLE VIRTUAL NETWORK STACK INSTANCES USING VIRTUAL NETWORK INTERFACE CARDS

(75) Inventors: Nicolas G. Droux, Rio Rancho, NM (US); Erik Nordmark, Mountain View, CA (US); Sunay Tripathi, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1071 days.

This patent is subject to a terminal disclaimer.

(21) Appl. No.: 11/489,942

(22) Filed: Jul. 20, 2006

(65) Prior Publication Data

US 2008/0019359 A1 Jan. 24, 2008

(51) Int. Cl.
*H04L 12/28* (2006.01)
(52) U.S. Cl. .................. 370/389; 379/342; 710/316
(58) Field of Classification Search ............... 379/389; 709/205, 230, 223; 718/1; 710/316; 707/104.1
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,502,884 B1 * | 3/2009 | Shah et al. ............. | 710/316 |
| 2002/0052972 A1 | 5/2002 | Yim | |
| 2003/0037154 A1 | 2/2003 | Poggio et al. | |
| 2003/0065676 A1 * | 4/2003 | Gbadegesin et al. ..... | 707/104.1 |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

*Primary Examiner*—Dang T Ton
*Assistant Examiner*—Lionel Preval
(74) *Attorney, Agent, or Firm*—Osha • Liang LLP (57) ABSTRACT

A method for processing packets that includes receiving a first packet for a first target by a network interface card (NIC), classifying the first packet, sending the first packet to a first receive ring in the NIC based on the classification of the first packet, sending the first packet to a Network Layer from the first receive ring, sending a first virtual network stack (VNS) Instance ID associated with the first receive ring to the Network Layer, obtaining a first VNS Instance parameter using the first VNS Instance ID, and processing the first packet in the Network Layer using the first VNS Instance parameter to obtain a first network processed packet.

18 Claims, 5 Drawing Sheets

U.S. PATENT DOCUMENTS

| | | |
|---|---|---|
| 2004/0015966 A1* | 1/2004 | MacChiano et al. ............ 718/1 |
| 2005/0135243 A1 | 6/2005 | Lee et al. |
| 2005/0138620 A1 | 6/2005 | Lewites |
| 2006/0041667 A1 | 2/2006 | Ahn et al. |
| 2006/0069792 A1* | 3/2006 | Pinkerton et al. ............ 709/230 |
| 2006/0070066 A1 | 3/2006 | Grobman |
| 2006/0174324 A1 | 8/2006 | Zur et al. |
| 2007/0061433 A1* | 3/2007 | Reynolds et al. ............ 709/223 |
| 2007/0244972 A1* | 10/2007 | Fan ............................ 709/205 |

* cited by examiner

MULTIPLE VIRTUAL NETWORK STACK INSTANCES USING VIRTUAL NETWORK INTERFACE CARDS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. application Ser. No. 11/489,929; and "Shared and Separate Network Stack Instances" with U.S. application Ser. No. 11/489,933.

BACKGROUND

Network traffic is transmitted over a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for processing packets. The method comprises receiving a first packet for a first target by a network interface card (NIC), classifying the first packet, sending the first packet to a first receive ring in the NIC based on the classification of the first packet, sending the first packet to a Network Layer from the first receive ring, sending a first virtual network stack (VNS) Instance ID associated with the first receive ring to the Network Layer, obtaining a first VNS Instance parameter using the first VNS Instance ID, and processing the first packet in the Network Layer using the first VNS Instance parameter to obtain a first network processed packet.

In general, in one aspect, the invention relates to a system. The system comprises a network interface card (NIC) comprising, a hardware classifier, and a first receive ring and a second receive ring, wherein the NIC is configured to receive a first packet for a first target on a host, classify the first packet using the hardware classifier, send the packet to the first receive ring in the NIC based on the classification of the first packet, obtain a first target ID associated with the target based on the classification of the first packet, and send the first packet and the first target ID to the host from the first receive ring, and the host, operatively connected to the NIC, comprising a Network Layer, a Transport Layer, and the first target, wherein the host is configured to: receive the first packet and the first target ID, obtain a first virtual network stack (VNS) ID using the first target ID, obtain a first VNS Instance parameter using the first VNS ID, and process the first packet in the Network Layer using the first VNS Instance parameter to obtain a first network processed packet.

In general, in one aspect, the invention relates to a method for send packets. The method comprises issuing a packet by a source executing on a host, determining a source ID corresponding to the source, determining a virtual network stack (VNS) instance ID using the source ID, obtaining a first VNS Instance parameter using the VNS Instance ID, and processing the first packet in a Transport Layer using the first VNS Instance parameter to obtain a first transport processed packet.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for providing multiple virtual network stack (VNS) instances in a single host, where the host includes virtual network interface cards (VNICs). More specifically, embodiments of the invention enable each packet destination or non-global container in a host to be associated with a separate VNS Instance, where each VNS Instance includes its own set of VNS Instance parameters. The use of VNS Instances allows a single host with a single Network layer and a single Transport layer to support multiple configurations at the Network layer and the Transport layer. Accordingly, one packet destination may use a first routing protocol (e.g., Routing Information Protocol (RIP)) and Transmission Control Protocol (TCP), while a second packet destination may use a second routing protocol (e.g., Open Shortest Path First (OSPF)) and User Datagram Protocol (UDP).

Figure 1:
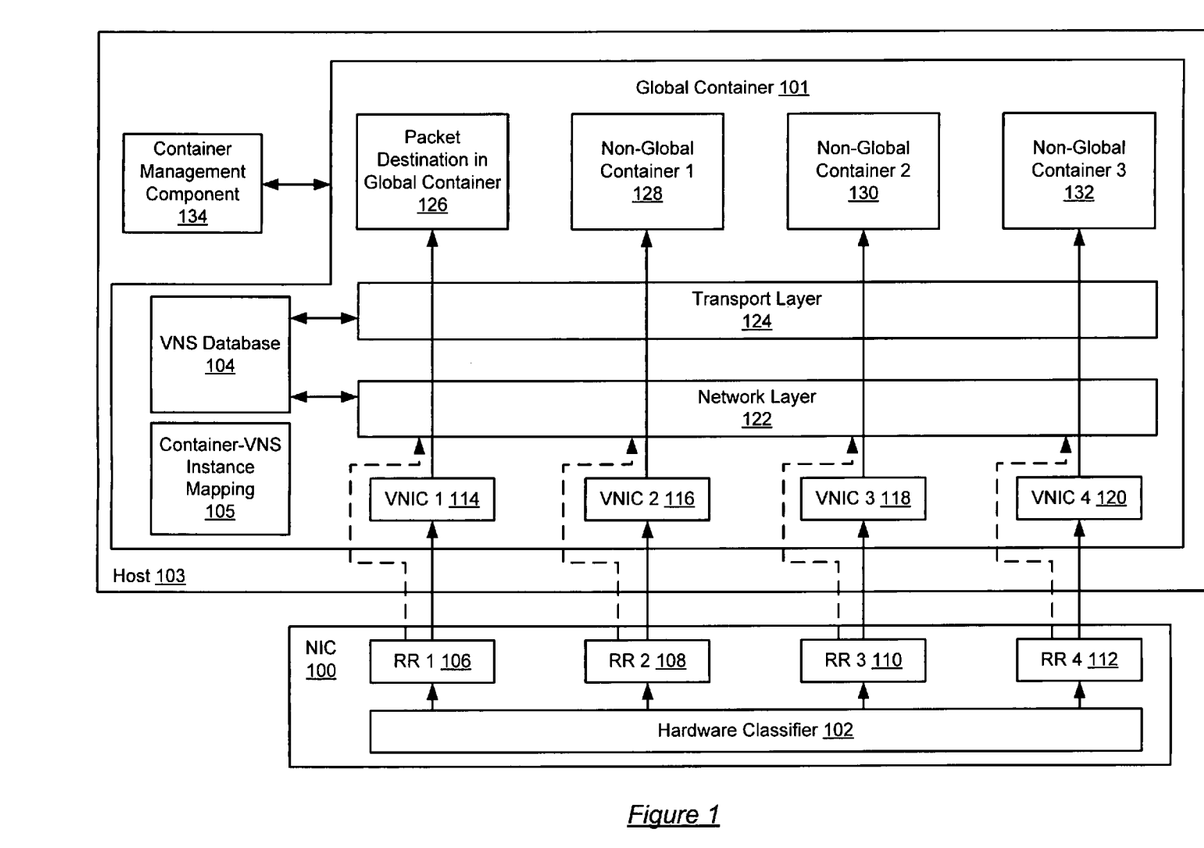
FIG. 1 shows a system in accordance with one embodiment of the invention.

FIG. 1 shows a system in accordance with one embodiment of the invention. The system shown in FIG. 1 includes a host (103) and a network interface card (NIC) (100). The NIC (100) includes a hardware classifier (102) and a number of receive rings (RRs) (106, 108, 110, 112). The NIC (100) is configured to send and receive packets. The hardware classifier (102) is configured classify incoming packets (i.e. packets received by the NIC (100) from the network (not shown) (e.g., the Internet, a wide area network (WAN), a local area network (LAN), etc.).

The hardware classifier (102) classifies a packet based on information in the header of packet. Accordingly, the hardware classifier (102) may classify the packet based on one or a combination of the following: the source internet protocol (IP) address, the destination IP address, a source Media Access Control (MAC) address, a destination MAC address, a source port, a destination port, a protocol type (e.g., Transmission Control Protocol (TCP), User Datagram Protocol (UDP), etc.) The hardware classifier (102) is not limited to classifying a packet based on one of the aforementioned parameters.

Continuing with the discussion of FIG. 1, once a packet has been classified, the packet is forwarded to the appropriate RR (106, 108, 110, 112). Typically, each RR (106, 108, 110, 112) is configured to receive packets for a specific non-global container (128, 130, 132) or a particular packet destination in the global container (126). In one embodiment of the invention, each RR (106, 108, 110, 112) corresponds to a buffer in the NIC (100), which is configured to store a finite number of packets.

In one embodiment of the invention, each RR (106, 108, 110, 112) is associated with a non-global container (128, 130, 132) or a packet destination in a global container (126). Further, once the RR (106, 108, 110, 112) has been associated with a non-global container (128, 130, 132) or a packet destination in a global container (126), the container ID (discussed below) corresponding to the a non-global container (128, 130, 132) or the packet destination ID (discussed below) corresponding to a packet destination in a global container (126) is associated with the RR (106, 108, 110, 112). For example, if RR 2 (108) is associated with non-global container 1 (128), then the container ID corresponding to non-global container 1 (128) is associated with RR 2 (108).

Associating the RR (106, 108, 110, 112) with the non-global container (128, 130, 132) or the packet destination in a global container (126) may include, but is not limited to: (i) storing the container ID or packet destination ID in the RR (106, 108, 110, 112), (ii) associating each packet stored in the RR (106, 108, 110, 112) with the container ID or packet destination ID, or (iii) maintaining a RR-Container mapping in the NIC (100), where the RR-Container mapping specifies the container ID (or packet destination ID) for the non-global container (128, 130, 132) (or the packet destination in a global container (126)) associated with each RR (106, 108, 110, 112) in the NIC (100).

In one embodiment of the invention, in addition to associating the RR (106, 108, 110, 112) with a container ID or packet destination ID, each RR (106, 108, 110, 112) is associated with one or both of the following cookies: (i) a VNIC cookie and a (ii) Network Layer cookie. The VNIC cookie specifies a function entry point into a specific VNIC in the host and the Network Layer cookie specifies a function entry point into the Network Layer.

In addition, each RR (106, 108, 110, 112) is associated with an acceptor function. The acceptor function takes as input: (i) one of the aforementioned cookies (VNIC cookie or Network Layer cookie); (ii) a packet in the RR; and (iii) the container ID or packet destination ID. If the VNIC cookie is used as input to the acceptor function, then the packet and container ID are sent to the VNIC specified in the VNIC cookie. Alternatively, if the Network Layer cookie is used as input to the acceptor function, then the packet and container ID are sent to the Network Layer.

For example, a packet in RR 2 (108) may be sent to VNIC 2 (116) using a VNIC cookie that specifies VNIC 2 (116) or the packet may be sent directly to the Network Layer (122) using the Network Layer cookie. In one embodiment of the invention, the Network Layer cookie allows the packet to bypass the MAC layer (i.e., the layer in which the VNIC resides) thereby reducing the amount of processing required to send the packet from the RR to the non-global container or packet destination.

In one embodiment of the invention, the container ID (or packet destination ID) is not stored in the RR (106, 108, 110, 112); rather, the container ID (or packet destination ID) is stored in the VNIC associated with the RR. For example, VNIC 2 (116) stores the container ID for non-global container 1 (128) instead of RR 2 (108). In such cases, the aforementioned acceptor function does not require the container ID (or packet destination ID) as input.

In one embodiment of the invention, the RR (106, 108, 110, 112) or VNIC may include the VNS Instance ID, wherein the VNS Instance ID corresponds to the VNS Instance associated with the non-global container or packet destination in the global container. In such cases, the RR (106, 108, 110, 112) or the VNIC may not include the container ID or the packet destination ID. Further, the acceptor function takes the VNS Instance ID as input instead of (or in addition to the container ID or the packet destination ID). In addition, storing the VNS Instance ID corresponds to associating the RR (106, 108, 110, 112) with the non-global container or packet destination in the global container.

In one embodiment of the invention, the VNS Instance ID is not stored in the RR (106, 108, 110, 112); rather, the VNS Instance ID is stored in the VNIC associated with the RR. For example, VNIC 2 (116) stores the VNS Instance ID corresponding to the VNS Instance associated with non-global container 1 (128) instead of RR 2 (108). In such cases, the aforementioned acceptor function does not require the container ID (or packet destination ID) as input.

Continuing with the discussion of FIG. 1, the host (103) includes a device driver (not shown), a number of virtual network interface cards (VNICs) (114, 116, 118, 120), a Network Layer (122), Transport Layer (124), one or more packet destinations in the global container (126), one or more non-global containers (128, 130, 132), a container management component (134), a VNS database (104), and a Container-VNS Instance Mapping. Each of the aforementioned components is described below.

Though not shown in FIG. 1, the device driver is configured to expose the NIC (100) to the host (103). Further, the device driver is configured to expose the individual RRs (106, 108, 110, 112) to the host (103). Exposing the aforementioned components to the host (103) includes providing application programming interfaces (APIs) to allow the host (103) (or components executing therein) to interact with the NIC (100) and the RRs (106, 108, 110, 112) on the NIC (100). Interacting with the NIC (100) typically includes obtaining packets from the NIC (100) and sending packets to the NIC (100).

Each VNIC (114, 116, 118, 120) in the host (103) includes the same functionality as the NIC (100). However, unlike the NIC (100), the VNICs (114, 116, 118, 120) are implemented in the host (103), typically, in a MAC layer of the host (103). To all components above the VNICs (114, 116, 118, 120) (e.g., the VNSs (122, 124, 126, 128), the packet destination in the global container (132), and the non-global containers (134, 136, 138)) the VNICs (114, 116, 118, 120) appear as physical NICs.

Each VNIC (114, 116, 118, 120) is associated with a MAC address and an IP address. Further, each VNIC (114, 116, 118, 120) may be optionally associated with a TCP port or UDP port. Further, each VNIC (114, 116, 118, 120) is associated with a RR (106, 108, 110, 112) such that the VNICs (114, 116, 118, 120) obtain packets from the RR (106, 108, 110, 112) with which it is associated. For example, VNIC 1 (114) obtains packets from RR 1 (106). In addition, each VNIC (114, 116, 118, 120) is configured to send packets received from an associated RR (106, 108, 110, 112) to the Network layer (122).

In one embodiment of the invention, the Network layer (122) is configured to perform Network layer processing. Network layer processing corresponds to functionality to manage packet addressing and delivery on a network (e.g., functionality to support Internet Protocol (including, but not limited to, IPv4 and IPv6), Address Resolution Protocol (ARP), Internet Control Message Protocol (ICMP), etc.).

The Network layer (122) shown in FIG. 1 is used by all packet destinations in the global container (e.g., 126) as well as all non-global containers (128, 130, 132). However, the specific portions of the Network layer (122) implemented for a packet destination (126) or non-global container (128, 130, 132) depend on the VNS Instance parameters associated with the packet destination (126) or non-global container (128, 130, 132).

Said another way, the Network layer (122) corresponds to a common set of methods used to perform Network layer (122) processing. However, one or more of the methods in the Network layer (122) requires one or more VNS Instance parameters as input, for example, one method may require the IP address associated with a non-global container (128, 130, 132) as well as the IP routing algorithm (e.g., RIP, OSPF, etc.). Thus, depending on the VNS Instance parameters input into the one or more of the aforementioned methods, the manner in which packets for a first non-global container are processed may be different then the manner in which packets for a second non-global container are processed.

In one embodiment of the invention, the Transport layer (124) is configured to perform Transport layer processing. Transport layer processing corresponds to functionality to manage the transfer of packets on the network (e.g., functionality to support Transmission Control Protocol, User Datagram Protocol, Stream Control Transmission Protocol (SCTP), etc.).

The Transport layer (124) shown in FIG. 1 is used by all packet destinations in the global container (e.g., 126) as well as all non-global containers (128, 130, 132). However, the specific portions of the Transport layer (124) implemented for a packet destination (126) or non-global container (128, 130, 132) depends on the VNS Instance parameters associated with the packet destination (126) or non-global container (128, 130, 132).

Said another way, the Transport layer (124) corresponds to a common set of methods used to perform Transport layer (124) processing. However, one or more of the methods in the Transport layer (124) requires one or more VNS Instance parameters as input, for example, one method may require a protocol to implement (e.g., TCP or UDP). Thus, depending on the VNS Instance parameters input into the one or more of the aforementioned methods, the manner in which packets for a first non-global container are processed may be different then the manner in which packets for a second non-global container are processed.

In one embodiment of the invention, the Network layer (122) and the Transport layer (124) are configured to support multithreading. Thus, multiple non-global containers and/or packet destinations in the global container may be simultaneously processing packets in the Network layer (122) and the Transport layer (124).

As shown in FIG. 1, the host (103) includes a global container (101) and a number of non-global containers (128, 130, 132). The global container (101) corresponds to an isolated execution environment within the host (103). Further, each non-global container (128, 130, 132) corresponds to an isolated execution environment within the global container (101). All of the containers (global and non-global) share a common kernel and, accordingly, are executing the same operating system. While all of the aforementioned containers share a common kernel, the non-global containers (128, 130, 132) are configured such that processes executing in a given non-global container are restricted to execute in the non-global container and have no access to resources not assigned to the non-global container. The isolated execution environments of each non-global container (128, 130, 132) as well as the global container (101) are managed by a container management component (134) executing on the host (103). The container management component (134) typically executes outside of the global container (101). An example of a container is a Solaris™ Container. (Solaris is a trademark of Sun Microsystems, Inc. of California, USA).

Each of the non-global containers (128, 130, 132) is configured to send and receive packets from the NIC (100) using the Network layer (122) and the Transport layer (124). In one embodiment of the invention, the packet destination in the global container (126) corresponds to a process executing in the global container (101), where the process is configured to send and receive packets but does not include its own internal networking stack. Rather, the packet destination (126) uses the Network layer (122) and the Transport layer (124) executing in the global container (126).

In one embodiment of the invention, each non-global container (128, 130, 132) and the global container are identified by a container ID. The container ID uniquely identifies the container in the host (103). Further, each packet destination in the global container (126) is also associated with an ID (i.e., a packet destination ID). The packet destination ID uniquely identifies the packet destination in the global container (101).

As shown in FIG. 1, the host (103) includes a VNS database (104) and a Container-VNS Instance Mapping (105). The VNS database (104) includes VNS Instance parameters for each VNS Instance in the host (103). Typically, there is one VNS Instance for each non-global container (128, 130, 132) and at least one VNS Instance for the packet destinations in the global container (126) (or there may be multiple VNS Instances in the global container, where each packet destination is associated with one of the multiple VNS instances). In one embodiment of the invention, a VNS Instance corresponds to grouping of VNS Instance parameters and is identified by a VNS Instance ID. The VNS Instance ID uniquely identifies the VNS Instance in the host (103).

In one embodiment of the invention, a VNS Instance parameter corresponds to any parameter that is associated with networking. Examples, of VNS Instance parameters may include, but are not limited to, Media Access Control (MAC) address, Internet Protocol (IP) address, IP routing algorithm (e.g., Routing Information Protocol (RIP), Open Shortest Path First (OSPF), etc.), Transport layer protocol (e.g., Transmission Control Protocol (TCP), User Datagram Protocol (UDP), an IP routing table, default route (i.e., the route, set in the IP routing table, used when no other entry in the IP routing table matches the destination IP address of the packet), TCP parameters (i.e., parameters in the TCP that may be changed, for example, bandwidth-delay product, buffer size, etc.), IP parameters (i.e., parameters in the IP that may be changed), TCP port number, and UDP port number.

In one embodiment of the invention, each VNS Instance includes a value for all VNS Instance parameters for the particular VNS Instance. The value for a particular VNS instance parameter may be specified or a default value for the VNS Instance parameter may be used. For example, assume that each VNS instance must specify an IP address, an IP routing algorithm, a default route, and a Transport Layer protocol. Further, assume that only values for the IP address, and IP routing algorithm are provided. Accordingly, default values are obtained for the default route and Transport Layer Protocol.

The VNS Instance parameters are typically specified by a packet destination in the global container or a non-global container. The specific of values for VNS Instance parameters is typically dictated by the requirements of the packet destination in the global container or the non-global container with which the VNS Instance is associated. An embodiment of a VNS database is shown in FIG. 2A below.

In one embodiment of the invention, the Container-VNS Instance Mapping (105) maps each container (global and non-global) to a VNS Instance. The container is typically identified by a container ID and the VNS Instance is typically identified by the VNS Instance ID. In one embodiment of the invention, if the global container includes multiple packet destinations, then each of the packet destinations may be identified by a packet destination ID. Further, if the packet destination IDs are included in the Container-VNS Instance Mapping (105), then the global container may not be listed in an entry in the Container-VNS Instance Mapping (105). Further, the Container-VNS Instance Mapping (105) may additionally include mappings between packet destinations in the global container and VNS instances. Both the VNS database (104) and a Container-VNS Instance Mapping (105) are typically located in the global container (126). An embodiment of a Container-VNS Instance mapping is shown in FIG. 2B below.

Figure 2A:
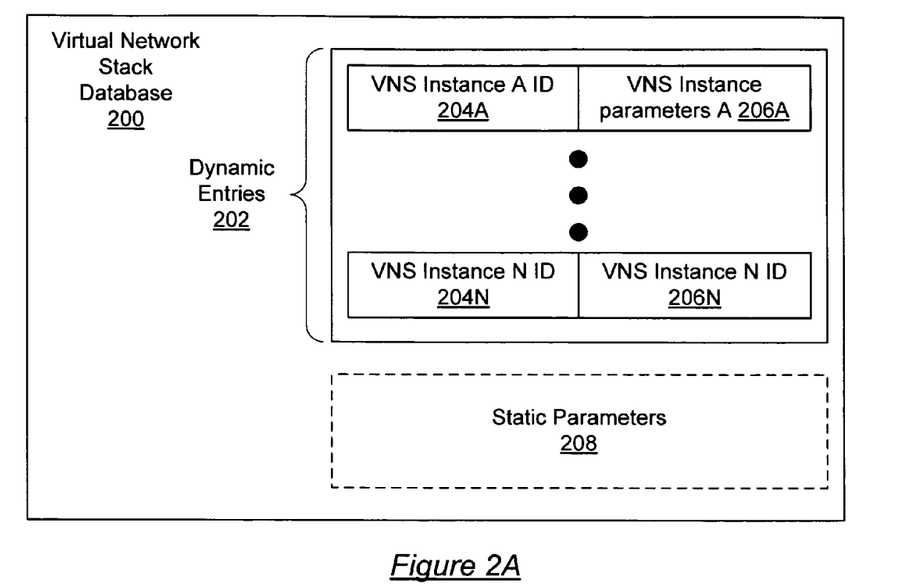
FIG. 2A shows a virtual network stack (VNS) database in accordance with one embodiment of the invention.
Figure 2B:
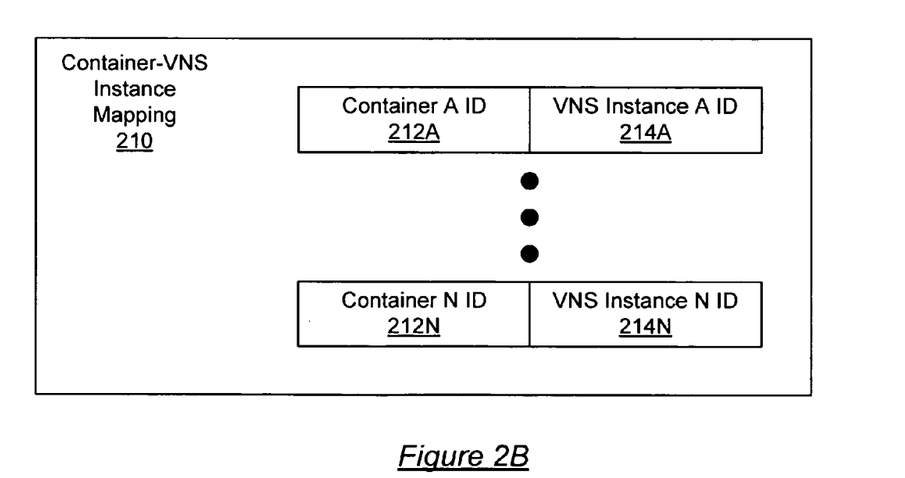
FIG. 2B shows a Container-VNS Instance mapping database in accordance with one embodiment of the invention.

FIG. 2A shows a virtual network stack (VNS) database in accordance with one embodiment of the invention. The VNS database (200) includes dynamic entries (202) and, optionally, static parameters (208). Each of the dynamic entries identifies a VNS Instance using a VNS Instance ID (204A, 204N) and includes the VNS Instance parameters associated with the VNS Instance (206A, 206N). In one embodiment of the invention, the VNS database (200) is configured to receive a VNS Instance ID, locate the corresponding dynamic entry using the VNS Instance ID, and return the VNS Instance parameters associated with the VNS Instance ID.

In one embodiment of the invention, the VNS database also includes logic to determine which of the VNS Instance parameters to return at any given time. For example, if a process in the Network layer sends the VNS Instance ID to the VNS database, then the VNS database may only return VNS Instance parameters associated with the Network layer (i.e., which may be used by the Network layer). In such cases, all other VNS Instance parameters are not sent to the Network layer.

Though not shown in FIG. 2A, the VNS database may include default values for VNS instance parameters. As discussed above, the default values correspond to values used for any VNS instance parameter not specified for the VNS Instance.

In one embodiment of the invention, the VNS Instance parameters for a particular VNS Instance may include both the VNS Instance parameters specified for the VNS Instance as well as the default values for VNS Instance parameters not specified for the VNS Instance. Alternatively, the VNS Instance parameters for a particular VNS Instance only include the VNS Instance parameters specified for the VNS Instance and the default values for the VNS Instance parameters not specified for the VNS Instance are located in a separate location in the VNS database or in another location in the host.

In one embodiment of the invention, the static parameters (208) correspond to parameters used by all VNS instances in the host (103). The static parameters (208) typically correspond to parameters that must be the same for all VNS instances executing on the host (103). As discussed above, the static parameters (208) are optionally located in the VNS database (200). As an alternative, the static parameters (208) may be located in a separate location in the global container or may be hard coded into the appropriate locations in the Network layer (122) and the Transport layer (124).

FIG. 2B shows a Container-VNS Instance Mapping in accordance with one embodiment of the invention. The Container-VNS Instance Mapping (210) includes a mapping of container ID (212A, 212N) to VNS Instance ID (214A, 214N). The aforementioned mapping associates the VNS Instance with a container. Thus, when a packet for the container is received by the host, the Container-VNS Instance Mapping (210) may be used to determine which of the VNS instances to use to process the inbound packet. Further, when the container issues a packet, the Container-VNS Instance Mapping (210) may be used to determine which of the VNS instances to use to process the outbound packet.

As discussed above, each packet destination in the global container may be identified with a packet destination ID and associated with a VNS Instance. In such cases, though not shown in FIG. 2B, the Container-VNS Instance Mapping (210) also includes a packet destination-VNS Instance mapping.

Figure 3:
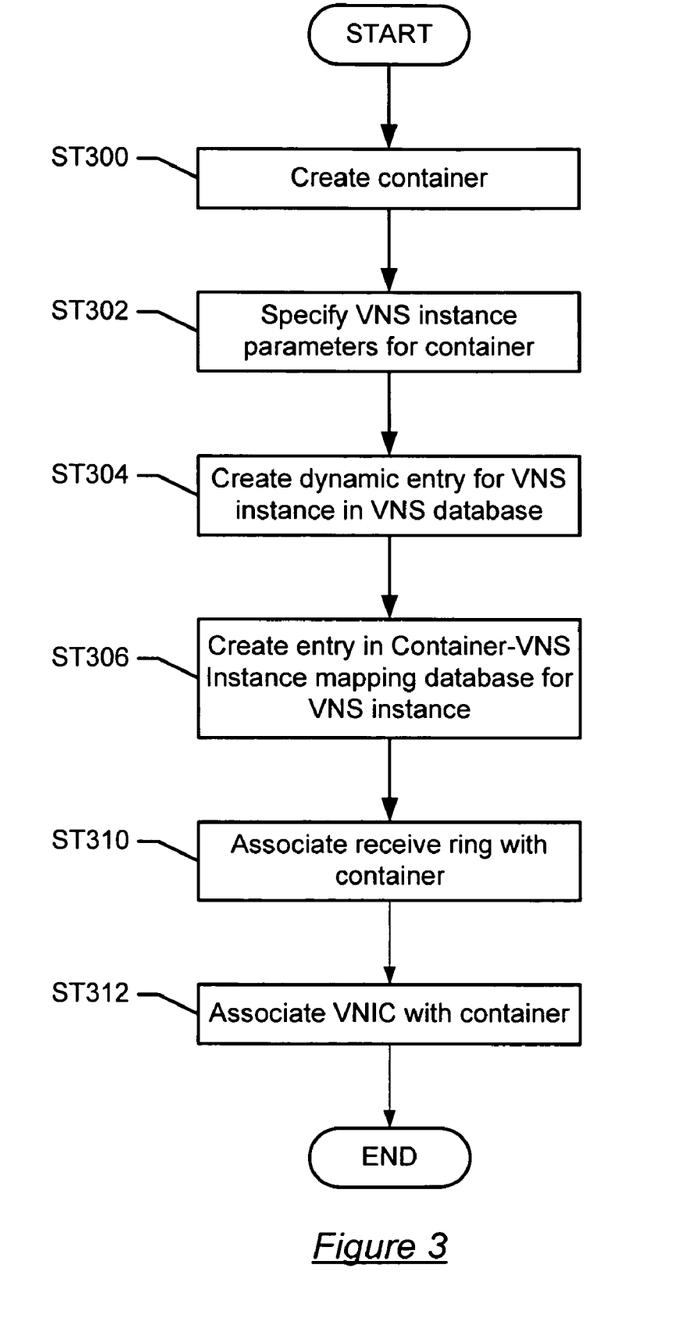
FIGS. 3 and 4 show flowcharts in accordance with one or more embodiments of the invention.

FIG. 3 shows a flowchart in accordance with one embodiment of the invention. More specifically, FIG. 3 shows a method for setting up host in accordance with one embodiment of the invention. Initially, a container is created (ST300). In one embodiment of the invention, creating the container includes assigning, typically by the container management component, a container ID to the container. The VNS Instance parameters for the container are then specified (ST302). In one embodiment of the invention, the VNS Instance parameters for the container correspond to the VNS Instance parameters that dictate how to process inbound packets to and outbound packets from the container. In one embodiment of the invention, if VNS Instance parameters specified in ST302 do not provide values for all VNS Instance parameters that may be specified, then default values are obtained for all VNS Instance parameters not specified.

A dynamic entry is then created in the VNS database (ST304). The dynamic entry includes the VNS Instance ID as well as the VNS Instance parameters (including, if present, default values for one or more VNS Instance parameters). In one embodiment of the invention, the VNS database assigns the VNS Instance ID to the VNS Instance. An entry in the Container-VNS Instance Mapping is subsequently created, where the entry associates the container (using the container ID) with the VNS Instance (using the VNS Instance ID) (ST306).

A receive ring is subsequently associated with the container (ST310). Associating the receive ring with the container includes: (i) programming the hardware classifier on the NIC to send packets for the container to the receive ring, (ii), optionally, associating the receive ring with the container ID (discussed above) and (iii), optionally, storing a VNS Instance ID in the receive ring, wherein the VNS Instance ID corresponds to the VNS Instance specified in the dynamic entry created in ST304. A VNIC is also associated with the container (ST312). Associating the VNIC with the container includes placing a VNIC cookie corresponding to the VNIC in the receive ring specified in ST310. Further, as discussed above, the VNIC may also, optionally, store the container ID and/or the VNS Instance ID, wherein the VNS Instance ID corresponds to the VNS Instance specified in the dynamic entry created in ST304. The process in FIG. 3 may also be used for packet destinations in a global container.

Figure 4:
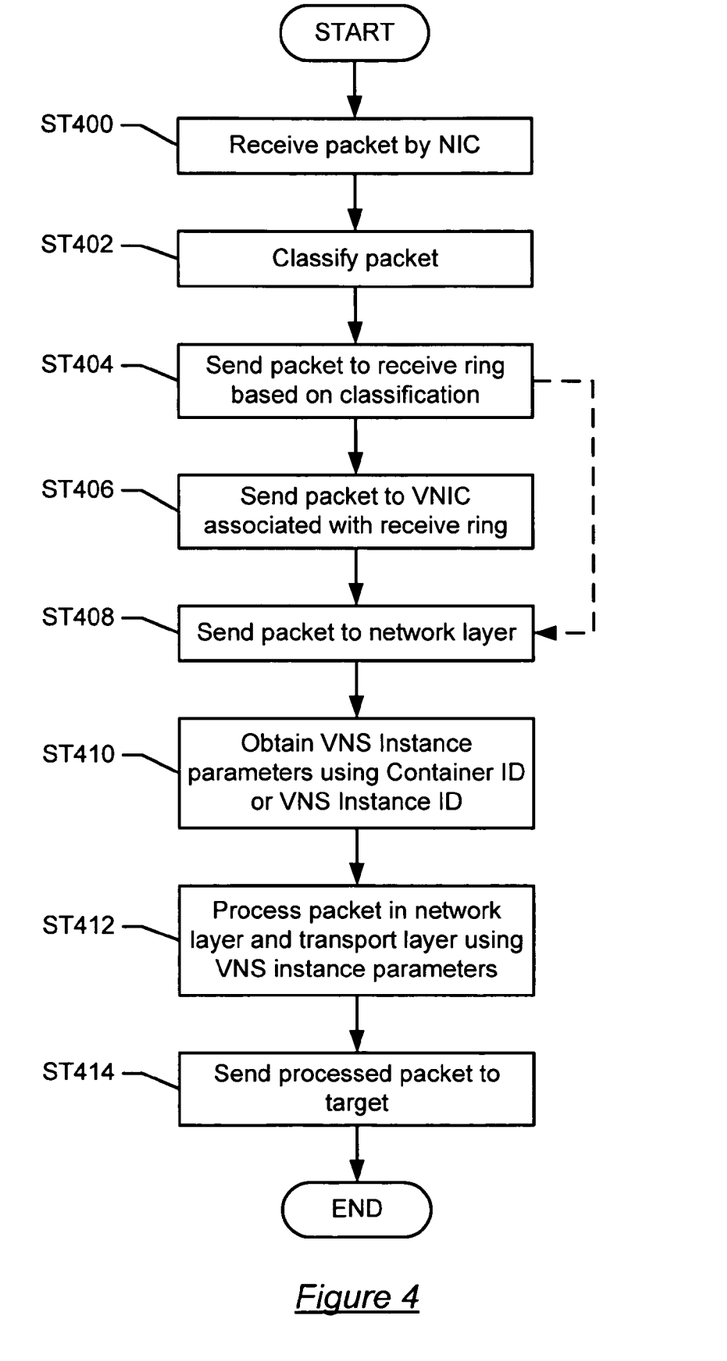

FIG. 4 shows a flowchart in accordance with one embodiment of the invention. More specifically, FIG. 4 describes a method for processing a packet in accordance with one embodiment of the invention.

Initially, a packet is received by a NIC (ST400). The packet is then classified using the hardware classifier in the NIC (ST402). In one embodiment of the invention, the header of the packet is used in the classification of the packet. In one embodiment of the invention, the destination IP address, the destination MAC address, the destination port (TCP or UDP) or a combination thereof may be used to classify the packet. The packet is then sent to the receive ring based on the classification (ST404).

At this stage, the packet is, optionally, sent to the VNIC associated with the receive ring (ST406). The target ID and/or the VNS Instance ID may be sent with the packet depending on whether the target ID and/or the VNS Instance ID is associated with the receive ring. In one embodiment of the invention, the target of the packet is a non-global container or a packet destination in the global container. The VNIC subsequently sends the packet to the Network Layer (ST408). The target ID and/or the VNS Instance ID may be sent with the packet depending on the implementation (see ST410). As discussed above, the target ID and/or the VNS Instance ID may be obtained from the VNIC.

The host (or a process executing thereon) obtains the VNS Instance parameters using the VNS Instance ID or the target ID (ST410). If the VNS Instance ID is provided, then the VNS Instance parameters may be obtained directly from the VNS database. If the target ID is available, then the target ID is used to obtain the VNS Instance ID corresponding to the VNS Instance associated with the target using the Container-VNS mapping. The VNS Instance ID is then used to obtain the VNS Instance parameters from the VNS database.

Regardless of how they are obtained, the VNS Instance parameters are then used by the Network layer and the Transport layer to process the packet (ST412). The processed packet is then sent to the target (ST414).

In one embodiment of the invention, the packet may be forwarded directly from the receive ring to the network layer (as denoted by the dotted line in FIG. 4). Further, a method, similar to the one described in FIG. 4, may be used when transmitting packets from a packet destination or a non-global container to the network via the NIC.

In one embodiment of the invention, when a packet is issued from a non-global container or a packet destination in the global container, the packet is issued with a Target ID. The target ID is then used to obtain the corresponding VNS Instance ID from the Container-VNS mapping. The VNS Instance ID is then used to obtain the corresponding VNS Instance parameters from the VNS database. The issued packet is then processed by the Transport layer and the network layer in accordance with the VNS Instance parameters. Once the aforementioned processing is complete, the packet is sent to the NIC. Upon receipt, the NIC sends to the packet to the network.

The following is an example in accordance with one embodiment of the invention. The example is not intended to limit the scope of the invention. Referring to FIG. 1, assume that packet destination (126) is associated with the following VNS Instance parameters: (i) use the RIP routing algorithm for network level processing; (ii) the packet destination is associated with IP address 10.2.5.1; (iii) use TCP for transport level processing; and (iv) use default values for the remaining VNS Instance parameters. Non-global container 1 (128) is associated with the following VNS Instance parameters: (i) non-global container 1 is associated with IP address 10.2.5.5; (ii) use UDP for transport level processing; and (iii) use default values for the remaining VNS Instance parameters. Non-global zone 2 (114) is associated with the following VNS Instance parameters: (i) non-global container 2 is associated with IP address 10.3.1.2; (ii) use UDP for transport level processing; (iii) use the OSPF routing algorithm network level processing; (iv) set the default route to 10.12.5.4; and (iv) use default values for the remaining VNS Instance parameters. Further, assume the target of packet 1 is packet destination (126), the target of packet 2 is non-global container 1 (128), and that packet 3 is issued by non-global container 2 (114).

When packet 1 is received by the NIC (103), the NIC classifies the packet (i.e., identifies that the target of the packet as packet destination (126)) and sends to the packet to RR 1 (106). Assume that RR 1 (106) includes the packet destination ID of packet destination (126) and a VNIC cookie corresponding to VNIC 1 (114).

An acceptor function is subsequently executed, where the acceptor function takes the following inputs: (i) packet 1; (ii) the VNIC cookie; and (iii) the packet destination ID. The result of executing the aforementioned acceptor function is that packet 1 is sent to VNIC 1(114). VNIC 1 (114) subsequently sends packet 1 to the Network layer (122). Prior to sending packet 1 to the network layer (or once packet 1 is received by the network layer), the VNS Instance ID is obtained using the packet destination ID. The VNS Instance ID is then used to obtain the VNS parameters.

The VNS Instance parameters are subsequently used by the Network layer (122) and the Transport layer (124) to process packet 1. More specifically, the Network layer (122) implements the RIP routing algorithm and uses IP address 10.2.5.1 as the IP address of the packet destination. Further, the Transport layer (124) implements TCP. In one embodiment of the invention, the Network layer (122) only obtains the VNS Instance parameters associated with the Network layer (122). Similarly, the Transport layer (124) only obtains the VNS Instance parameters associated with the Transport layer (124).

When packet 2 is received by the NIC (103), the NIC classifies the packet (i.e., identifies that the target of the packet as non-global container 1 (128)) and sends to the packet to RR 2 (108). Assume that RR 2 (106) includes the VNS Instance ID and a Network Layer. An acceptor function is subsequently executed, where the acceptor function takes the following inputs: (i) packet 2; (ii) the Network Layer cookie; and (iii) the packet destination ID. The result of executing the aforementioned acceptor function is that packet 2 is sent to directly to the Network layer (122). Once packet 2 is received by the Network layer, the VNS Instance ID is used to obtain the VNS parameters.

The VNS Instance parameters are then used by the Network layer (122) and the Transport layer (124) to process packet 2. More specifically, the Network layer (122) uses IP address 10.2.5.5 as the IP address of non-global container 1. Further, the Transport layer (124) implements UDP. In one embodiment of the invention, the Network layer (122) only obtains the VNS Instance parameters associated with the Network layer (122). Similarly, the Transport layer (124) only obtains the VNS Instance parameters associated with the Transport layer (124).

When packet 3 is issued by non-global container 2 (130), the host identifies non-global container 2 (130) as the issuing container. The host then obtains the corresponding container ID (i.e., the container ID associated with non-global container 2 (130)). The host (103) then proceeds to obtain the VNS Instance ID and, in due course, the VNS Instance parameters associated with the VNS Instance (as identified by the VNS Instance ID) using the container ID.

The VNS Instance parameters are then used by the Network layer (122) and the Transport layer (124) to process packet 2. More specifically, the Network layer (122) implements the OSPF routing algorithm, uses 10. 12. 5. 4 as the default route in the IP routing table, and uses IP address 10.3.1.2 as the IP address of non-global container 2. Further, the Transport layer (124) implements UDP. In one embodiment of the invention, the Network layer (122) only obtains the VNS Instance parameters associated with the Network layer (122). Similarly, the Transport layer (124) only obtains the VNS Instance parameters associated with the Transport layer (124).

Figure 5:
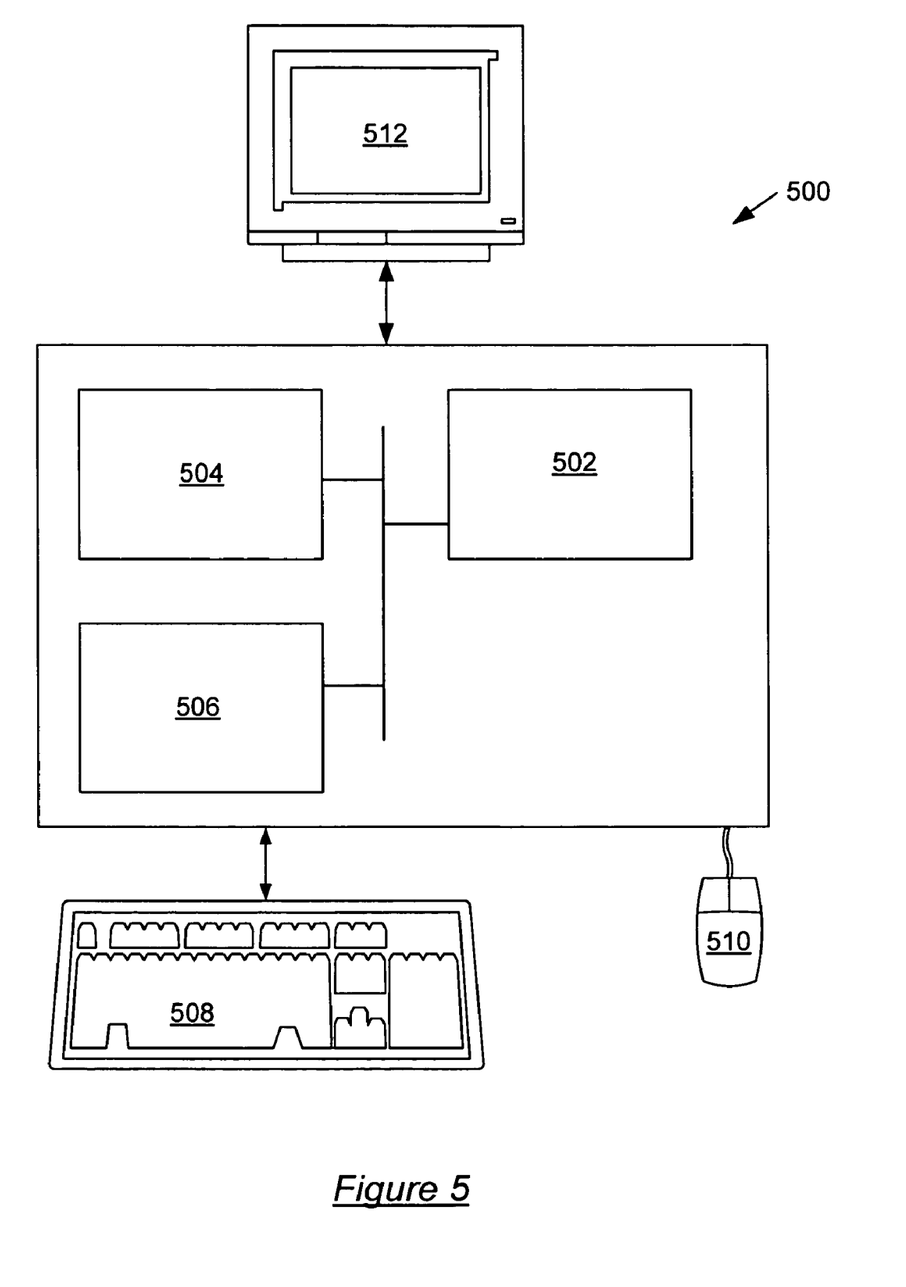
FIG. 5 shows a computer system in accordance with one embodiment of the invention.

An embodiment of the invention may be implemented on virtually any type of computer regardless of the platform being used. For example, as shown in FIG. 5, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network via a network interface connection (not shown). Those skilled in the art will appreciate that these input and output means may take other forms. Further, those skilled in the art will appreciate that one or more elements of the aforementioned computer (500) may be remotely located and connected to the other elements over a network. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising software instructions, when executed by a processor, perform a method for processing packets, the method comprising:
   receiving a first packet for a first target by a network interface card (NIC);
   classifying the first packet;
   sending the first packet to a first receive ring in the NIC based on the classification of the first packet;
   sending the first packet to a Network Layer from the first receive ring;
   sending a first virtual network stack (VNS) Instance ID associated with the first receive ring to the Network Layer;
   obtaining a first VNS Instance parameter using the first VNS Instance ID; and
   processing the first packet in the Network Layer using the first VNS Instance parameter to obtain a first network processed packet;
   receiving a second packet for a second target by the NIC;
   classifying the second packet;
   sending the second packet to a second receive ring in the NIC based on the classification of the second packet;
   sending the second packet to the Network Layer from the second receive ring;
   sending a second VNS Instance ID associated with the second receive ring to the Network Layer;
   obtaining a second VNS Instance parameter using the second VNS Instance ID; and
   processing the second packet in the Network Layer using the second VNS Instance parameter to obtain a second network processed packet.

2. The computer readable medium of claim 1, wherein the first VNS Instance parameter and the second VNS Instance parameter are located in a VNS database in a global container on the host.

3. The computer readable medium of claim 1 further comprising software instructions, when executed, perform the method, the method further comprising:
   sending the first network processed packet to a Transport Layer in the host;
   obtaining a third VNS Instance parameter using the first VNS Instance ID;
   processing the first processed network packet in the Transport Layer using the third VNS Instance parameter to obtain a first Transport Layer processed packet; and
   sending the first Transport Layer processed packet to the first target.

4. The computer readable medium of claim 1,
   wherein the first receive ring is associated with a first target ID, and
   wherein sending the first VNS Instance ID associated with the receive ring to the Network Layer comprises obtaining a first target ID from the first receive ring.

5. The computer readable medium of claim 1, wherein the first VNS Instance parameter specifies a network routing algorithm.

6. The computer readable medium of claim 1, wherein the first target is one selected from a group consisting of a packet destination in a global container and a non-global container in the global container.

7. The computer readable medium of claim 1, wherein the first VNS Instance parameter is one selected from a group consisting of an IP routing table, a default route entry in the IP routing table, an IP routing algorithm, and a Transport layer algorithm.

8. The computer readable medium of claim 1, wherein determining the first target of the first packet comprises analyzing a header of the first packet to obtain one selected from a group consisting of a destination IP address and a destination Media Access Control (MAC) address.

9. The computer readable medium of claim 1, wherein sending the first packet to the Network Layer from the first receive ring comprises:
   sending the first packet from the first receive ring to a virtual network interface card (VNIC); and
   sending the first packet from the VNIC to the Network Layer.

10. A system, comprising:
    a network interface card (NIC) comprising;
       a hardware classifier; and
       a first receive ring and a second receive ring, wherein the NIC is configured to:
          receive a first packet for a first target on a host;
          classify the first packet using the hardware classifier;
          send the packet to the first receive ring in the NIC based on the classification of the first packet;
          obtain a first target ID associated with the first target based on the classification of the first packet; and
          send the first packet and the first target ID to the host from the first receive ring;
          receive a second packet for the second target on the host;
          classify the second packet using the hardware classifier;

send the packet to the second receive ring in the NIC based on the classification of the second packet;
obtain a second target ID associated with the second target based on the classification of the second packet; and
send the second packet and the second target ID to the host from the second receive ring; and
the host, operatively connected to the NIC, comprising:
a Network Layer;
a Transport Layer; and
the first target,
wherein the host is configured to:
receive the first packet and the first target ID;
obtain a first virtual network stack (VNS) ID using the first target ID;
obtain a first VNS Instance parameter using the first VNS ID; and
process the first packet in the Network Layer using the first VNS Instance parameter to obtain a first network processed packet;
receive the second packet and the second target ID;
obtain a second virtual network stack (VNS) ID using the second target ID;
obtain a second VNS Instance parameter using the second VNS ID; and
process the second packet in the Network Layer using the second VNS Instance parameter to obtain a second network processed packet.

11. The system of claim 10, wherein the first VNS Instance parameter and the second VNS Instance parameter are located in a VNS database in a global container on the host.

12. The system of claim 10, wherein the host is further configured to:
send the first network processed packet to the Transport Layer in the host;
obtain a third VNS Instance parameter using the first VNS ID;
process the first processed network packet in the Transport Layer using the third VNS Instance parameter to obtain a first Transport Layer processed packet; and
send the first Transport Layer processed packet to the first target.

13. The system of claim 10,
wherein the first receive ring is associated with the first target ID and obtaining the first target ID associated with the first target based on the classification of the first packet comprises obtaining the first target ID from the first receive ring.

14. The system of claim 10, wherein sending the first packet to the Network layer from the first receive ring comprises:

sending the first packet from the first receive ring to a virtual network interface card (VNIC); and
sending the first packet from the VNIC to the Network Layer.

15. The system of claim 10, wherein the first target is one selected from a group consisting of a packet destination in a global container and a non-global container in the global container.

16. A non-transitory computer readable medium comprising software instructions, when executed by a processor, perform a method for sending packets, the method comprising:
issuing a first packet by a first source executing on a host;
determining a first source ID corresponding to the first source;
determining a first virtual network stack (VNS) instance ID using the first source ID;
obtaining a first VNS Instance parameter using the first VNS Instance ID;
processing, the first packet in a Transport Layer using the first VNS Instance parameter to obtain a first transport processed packet;
issuing a second packet by a second source executing on a host;
determining a second source ID corresponding to the second source;
determining a second virtual network stack (VNS) instance ID using the second source ID;
obtaining a second VNS Instance parameter using the second VNS Instance ID; and
processing, the second packet in the Transport Layer using the second VNS Instance parameter to obtain a second transport processed packet.

17. The computer readable medium of claim 16 further comprising software instructions, when executed, perform the method, the method further comprising:
receiving the first transport processed packet from the Transport Layer;
obtaining a third VNS Instance parameter using the first VNS Instance ID;
processing the first transport processed packet in a Network Layer using the third VNS Instance parameter to obtain a first network processed packet; and
sending the first network processed packet to a network interface card operatively connected to the host.

18. The computer readable medium of claim 17, wherein the source is one selected from a group consisting of a packet destination in a global container and a non-global container in the global container.

* * * * *

UNITED STATES PATENT AND TRADEMARK OFFICE
CERTIFICATE OF CORRECTION

| | | |
|---|---|---|
| PATENT NO. | : 7,885,257 B2 | |
| APPLICATION NO. | : 11/489942 | |
| DATED | : February 8, 2011 | |
| INVENTOR(S) | : Nicolas G. Droux et al. | |

It is certified that error appears in the above-identified patent and that said Letters Patent is hereby corrected as shown below:

Title Page Item [56] References Cited, under OTHER PUBLICATIONS, please add --Dovrolis, C., Thayer, B. and Ramanathan, P.: "HIP; Hybrid Interrupt - Polling for the Network Interface", ACM SIGOPS Operating Systems Review, Vol. 35, Iss. 4, October 2001, (11 Pages)--.

In Claim 4, Column 14 (line 24), --first-- should be added before "receive".

Signed and Sealed this
Twelfth Day of April, 2011

David J. Kappos
*Director of the United States Patent and Trademark Office*